July 14, 1931.  B. P. JOYCE  1,814,705
PACKING
Filed Dec. 3, 1928
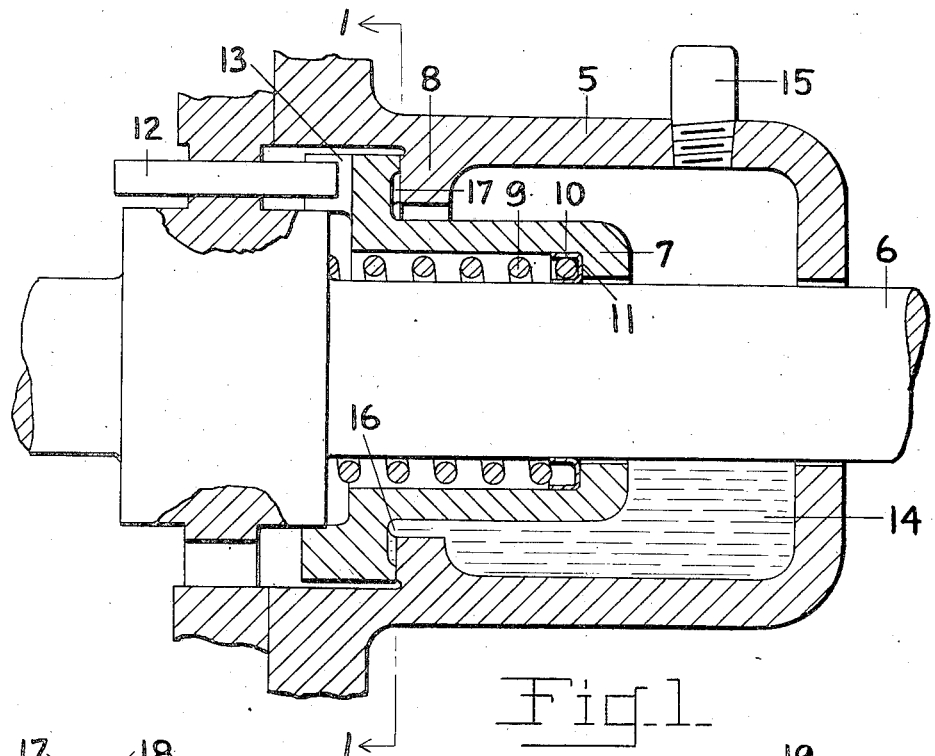
Fig.1
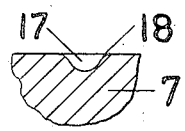
Fig.3
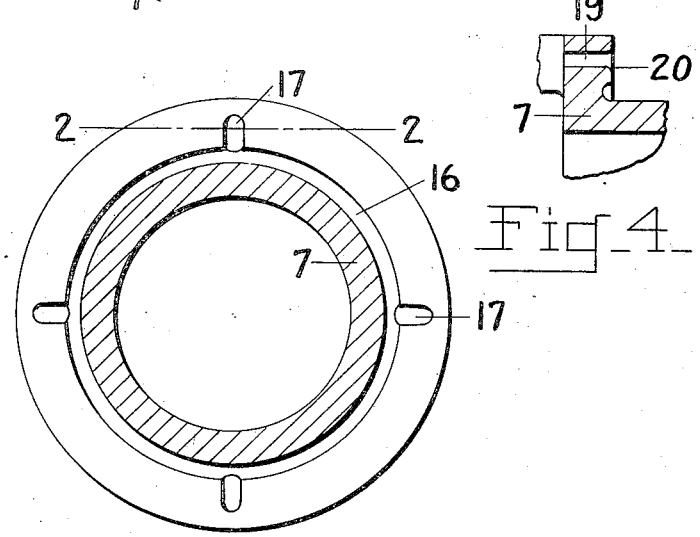
Fig.4
Fig.2
INVENTOR
Bryan P. Joyce Patented July 14, 1931

1,814,705

UNITED STATES PATENT OFFICE

BRYAN P. JOYCE, OF DAVENPORT, IOWA

PACKING

Application filed December 3, 1928. Serial No. 323,462.

My invention has reference in general, to packings, and more particularly it relates to a packing for use with rotating members.

The principal object of my invention is to provide a simple, compact and effective packing for rotating parts. Among the further objects of my invention are to provide a packing having but one sealing friction surface; to provide a packing capable of being operated at high speed without undue wear of the packing; to provide a packing which may be used with hot fluids; and such further objects, advantages and capabilities as will hereafter appear and as are inherent in the construction disclosed herein. My invention further resides in the combination, construction and arrangement of parts illustrated in the accompanying drawings, and, while I have disclosed therein what is now considered the preferred forms of this invention, I desire it understood that the present disclosure is to be considered as illustrative only and not as limiting my invention.

In the drawings annexed hereto and forming a part hereof, Fig. 1 shows a longitudinal section through the stuffing box of a rotary pump. Fig. 2 shows a section of the packing member on the line 1—1, of Fig. 1. Fig. 3 shows a fragmentary section on the line 2—2, of Fig. 2. Fig. 4 shows a modification of the sealing friction surface of the packing member.

Referring more in detail to the annexed drawings, 5 designates the pump casing in which a rotor 6 is mounted. The packing member 7, slidably mounted on the rotor 6, is maintained in contact with the casing at 8 by means of the spring 9, which also presses the packing ring 10 against its seat 11 in the packing member. A pin 12 in the rotor 6 engages a slot 13 in the packing member 7 and may be of sufficient length to engage a similar member at the other side of the rotor, the pin serving to carry the packing member with the rotor, in its rotary movement.

Lubricant 14 is introduced through the valve 15 and is at all times in communication with the groove 16 in the packing member. During operation of the pump, the pockets 17 receive lubricant from the groove 16 under pressure of centrifugal force and as the edges of the pockets are rounded as shown at 18, the viscosity of the lubricant causes a film of lubricant to be maintained between the sealing friction surface of the packing member and the casing.

When the nature of the pump fluid is such that it may be used as the lubricant, the pockets 17 are omitted and a series of holes 19 with rounded edges 20 are provided to conduct the pump fluid to the sealing surface, as shown in Fig. 4. In this construction the lubricant 14 is not supplied and centrifugal force prevents undue leakage of the pump fluid by the packing.

The packing ring 10 is made of thin, resilient metal such as brass or coin silver and is a light press fit both on the rotor and in the packing member, the spring 9 being of sufficient strength to overcome the friction of the packing ring with the rotor and maintain the packing member in contact with the casing at 8. The pressure of the pump fluid acts on the packing member over the annulus between its outer diameter and the circumference of the rotor at the packing ring. The film of lubricant between the packing member and the casing is of lesser area and must sustain this pressure, therefore the lubricant film is maintained under greater pressure than the pump fluid and prevents any passage of pump fluid by the packing.

The spring 9 may be made of spring steel, spring brass or other suitable metal. In case of a partial vacuum within the pump its strength is sufficient to overcome such vacuum in addition to the strength required for overcoming the friction of the ring 10 with the rotor.

When the packing is to be used for hot fluids or when the speed of operation is great enough to cause heating, I prefer to make the packing member of cast iron to contact a casing of cast iron. In other situations a member having a hard polished surface to contact a surface composed largely of tin or a steel member to contact a bronze casing may be used.

It is of course understood that the specific description of structure set forth herein may be departed from without departing from the spirit of my invention as set forth herein and expressed in the appended claims.

Having now described my invention, I claim:

1. In a pressure fluid machine including a casing and a rotor mounted therein, a metal packing member surrounding the rotor and having an annular sealing friction surface adapted to contact the inner wall of the casing, a pin engaging the packing member and the rotor to prevent rotary movement between them, lubricant within the casing and in communication with a groove in the packing member, said groove being adjacent to and concentric with the sealing friction surface of the packing member and having pockets extending outwardly and radially therefrom into said surface, a thin, resilient metal packing ring within the packing member between it and the rotor and seated against the packing member, resilient means acting between the rotor and the packing ring to maintain said ring against its seat and to press the sealing friction surface of the packing member against the casing wall and the packing member having a greater area exposed to the pressure of the machine fluid than the area of its sealing friction surface contacting the casing wall.

2. In a pressure fluid machine including a casing and a rotor mounted therein, a packing member surrounding said rotor and having an annular sealing friction surface contacting the inner wall of the casing, means engaging the packing member and the rotor to prevent rotary movement between them, lubricant within the casing and in communication with the sealing friction surfaces, said lubricant being adapted to maintain a film of lubricant between the surfaces during operation of the machine, a packing ring between the packing member and the rotor and sealing the joint between the packing member and the rotor and a single means maintaining the packing ring in position and cooperating with the machine fluid to maintain a greater unit pressure between the sealing friction surfaces than the unit pressure of the machine fluid.

3. The combination with a casing and a rotor, said rotor having a shaft projecting from said casing, of a cylindrical packing member surrounding said shaft and having a radial flange at each end thereof, the radial flange at the inner end of said member extending outwardly therefrom and being adapted to contact the inner side of the casing wall, the radial flange at the outer end of said member extending inwardly and being adapted to seat a packing ring, said packing ring being made of thin resilient metal and being adapted to seal the joint between the packing member and the shaft, resilient means acting between the rotor and the packing ring to maintain said ring upon its seat and to press the inner flange of the packing member against the casing wall, means engaging the rotor and the packing member adapted to prevent rotary movement between them, said casing including a chamber surrounding the outer end of the packing member and containing lubricant, a circular groove in the packing member having pockets extending radially therefrom into the surface of the flange contacting the casing wall, the chamber lubricant being adapted to enter said groove and said pockets being adapted to receive lubricant from said groove under centrifugal pressure when said rotor is in movement.

4. The combination with a casing and a rotor, said rotor having a shaft projecting from said casing, of a cylindrical packing member surrounding said shaft and having a radial flange at each end thereof, the radial flange at the inner end of said member extending outwardly therefrom and being adapted to contact the inner side of the casing wall, the radial flange at the outer end of said member extending inwardly and being adapted to seat a packing ring, said packing ring being made of thin resilient metal and being adapted to seal the joint between the packing member and the shaft, resilient means acting between the rotor and the packing ring to maintain said ring upon its seat and to press the inner flange of the packing member against the casing wall, means engaging the rotor and the packing member adapted to prevent rotary movement between them, and said casing including a chamber surrounding the outer end of the packing member and containing lubricant.

5. The combination with a casing and a rotor, said rotor having a shaft projecting from said casing, of a cylindrical packing member surrounding said shaft and having a radial flange at each end thereof, the radial flange at the inner end of said member extending outwardly therefrom and being adapted to contact the inner side of the casing wall, the radial flange at the outer end of said member extending inwardly and being adapted to seat a packing ring, said packing ring being made of thin resilient metal and being adapted to seal the joint between the packing member and the shaft, resilient means acting between the rotor and the packing ring to maintain said ring upon its seat and to press the inner flange of the packing member against the casing wall, means engaging the rotor and the packing member adapted to prevent rotary movement between them and fluid within said casing adapted to lubricate the contact of the packing member with the casing wall.

6. The combination with a casing and a rotor, said rotor having a shaft projecting from said casing, of a cylindrical packing member surrounding said shaft, said member contacting the inner side of the casing wall and seating a packing ring, said packing ring being adapted to seal the joint between the packing member and the shaft, resilient means acting between the rotor and the packing ring to maintain said ring upon its seat and to press the packing member against the casing wall, means engaging the rotor and the packing member adapted to prevent rotary movement between them, said casing including a chamber surrounding the outer end of the packing member and containing lubricant, and said lubricant being adapted to be fed to the contact of the packing member with the casing wall under centrifugal pressure, when said rotor is in movement.

7. The combination with a rotatable shaft and a wall through which it extends; of a cylindrical packing member surrounding said shaft and having a radial flange at each end thereof, one flange extending outwardly from the packing member and contacting the wall, the other flange extending inwardly from the packing member and seating a packing ring, said packing ring being made of thin, resilient metal and sealing the joint between the packing member and the shaft, resilient means acting between the shaft and the packing ring to maintain said ring upon its seat and to press the outwardly extending flange of the packing member against the wall, means engaging the shaft and the packing member to prevent rotary movement between them but permitting longitudinal movement, a lubricant reservoir secured to the wall opposite the contact of the packing member flange with said wall, said reservoir containing lubricant and surrounding the end of the packing member having the inwardly extending flange, a circular groove in the outwardly extending flange of the packing member, pockets with rounded edges extending radially from said groove into the surface of the flange contacting said wall, and the reservoir lubricant filling a portion of said circular groove.

8. The combination with a rotatable shaft and a wall through which it extends; of a packing member surrounding said shaft and having an annular sealing friction surface contacting said wall, means engaging the shaft and the packing member to prevent rotary movement between them but permitting longitudinal movement, a thin, resilient metal packing ring seated within the packing member, between it and the shaft, resilient means acting between the shaft and said packing ring to maintain said ring upon its seat and to press the packing member against the wall, a lubricant reservoir secured to the wall opposite the contact of the packing member with said wall, lubricant within said reservoir and said lubricant being adapted to be fed under centrifugal pressure, to the contact of the packing member with the wall, when said shaft is in movement.

9. The combination with a rotatable shaft and a wall through which it extends; of a packing member surrounding said shaft and having an annular friction surface contacting said wall, a packing ring seated within the packing member, between it and the shaft, resilient means acting between the shaft and the packing ring to maintain said ring upon its seat and to press the packing member against said wall, a lubricant reservoir secured to the wall opposite the contact of the packing member with said wall, lubricant within said reservoir and said lubricant being adapted to be fed under centrifugal pressure, to the contact of the packing member with the wall, when said shaft is in movement.

10. The combination with a rotatable shaft and a wall through which it extends; of a packing member surrounding said shaft and having an annular sealing friction surface contacting said wall, a packing ring seated within said member between it and the shaft, means acting between the shaft and said packing ring to maintain said ring upon its seat and to press the packing member against said wall, means containing lubricant and said lubricant contacting the inner circumference of the contact of the packing member with the wall.

In witness whereof, I hereunto subscribe my name to this specification.

BRYAN P. JOYCE.